Patented Aug. 24, 1926.

1,597,165

UNITED STATES PATENT OFFICE.

MARJAN MARKIEWICZ AND WALDEMAR RÖMER, OF WARSAW, POLAND.

DRY CELL.

No Drawing. Application filed May 31, 1924, Serial No. 717,165, and in Germany July 5, 1923.

Our invention relates to improvements in dry cells with zinc and carbon as electrodes, depolarizer comprising manganese dioxide and thickened electrolyte comprising ammonium chloride, and has for its object to receive such dry cells of this type, which could be used as secondary cells.

We attain this object by adding of chloride of magnesium to the thickened electrolyte and by the ensuing removal (e. g. decantation) of that water, which was not absorbed by this electrolyte.

As chloride of magnesium combines as well with water alone as with water and ammonium chloride, the proportion thereof to be employed, relatively to the amount of ammonium chloride in the thickened electrolyte of the dry cell constructed according to the invention, is quite optional.

It has been found, however, that good results are obtained, if the thickened electrolyte comprises ammonium chloride and chloride of magnesium in proportion of their molecular weights.

It may be remarked, that the water released from the thickened electrolyte during the discharging of the cell, will be reabsorbed when charging and does not cause blowing up gases.

The attendance of the described dry cells and their applications sphere are like those of primary dry cells.

We are aware that prior to our invention dry cells with zinc and carbon as electrodes, depolarizer comprising manganese dioxide and thickened electrolyte comprising ammonium chloride have been made as well (1) with addition of chloride of magnesium to the electrolyte, as (2) with hermetical sealing of the dry cell or (3) with thickened electrolyte comprising only water being absorbed by this electrolyte. We therefore do not claim the application of each of these three means separately.

What we claim as new and desire to secure by Letter Patent of the United States is:

1. In dry, completely sealed cells with zinc and carbon as electrodes and with manganese dioxide as depolarizer, a thickened electrolyte paste comprising ammonium chloride and magnesium chloride, said electrolyte paste containing only such an amount of water as it can be entirely absorbed by the electrolyte paste and therein included chlorides.

2. In dry, completely sealed cells with zinc and carbon as electrodes and with manganese dioxide as depolarizer, a thickened electrolyte paste comprising ammonium chloride and magnesium chloride in proportion to their molecular weights, said electrolyte paste containing only such an amount of water as it can be entirely absorbed by the electrolyte paste and therein included chlorides.

In testimony whereof we have signed our names to this specification.

MARJAN MARKIEWICZ.
WALDEMAR RÖMER.